May 24, 1966 N. C. L. BROWN 3,253,142
CONTROL SYSTEM FOR TRACK BRAKES
Original Filed June 2, 1953 4 Sheets-Sheet 1

INVENTOR.
N.C.L. BROWN
BY
Forest B. Hitchcock
HIS ATTORNEY

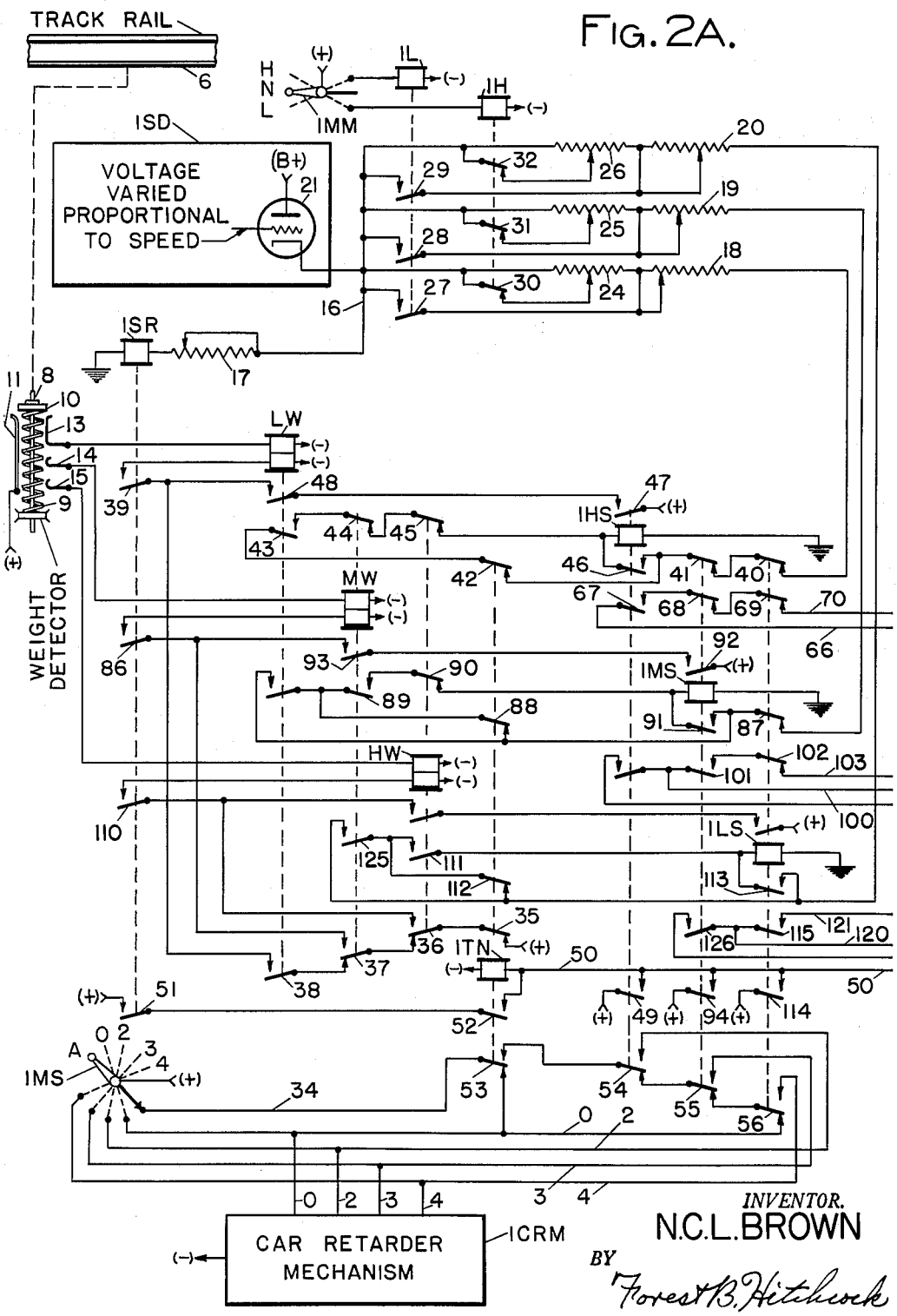

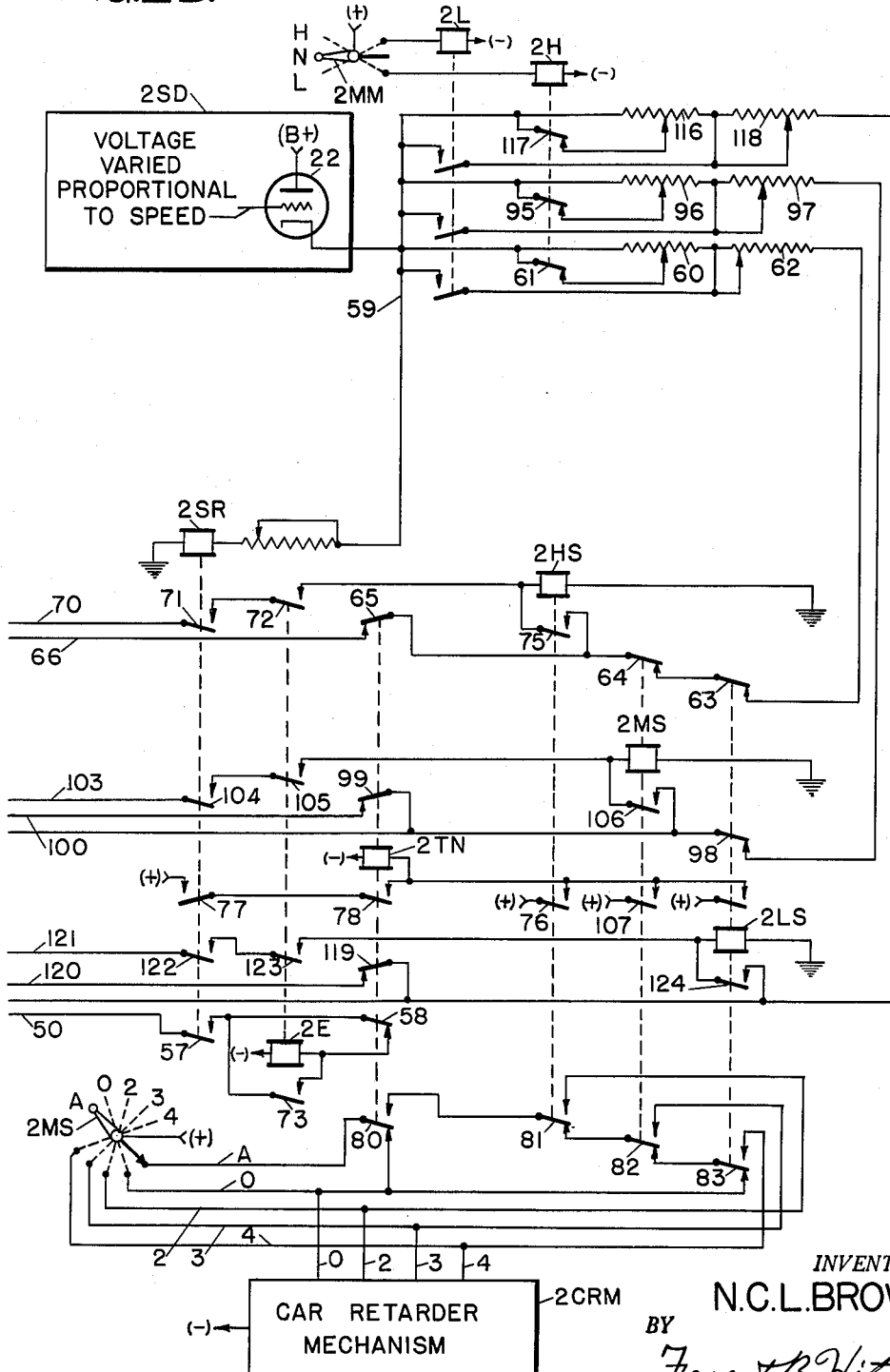

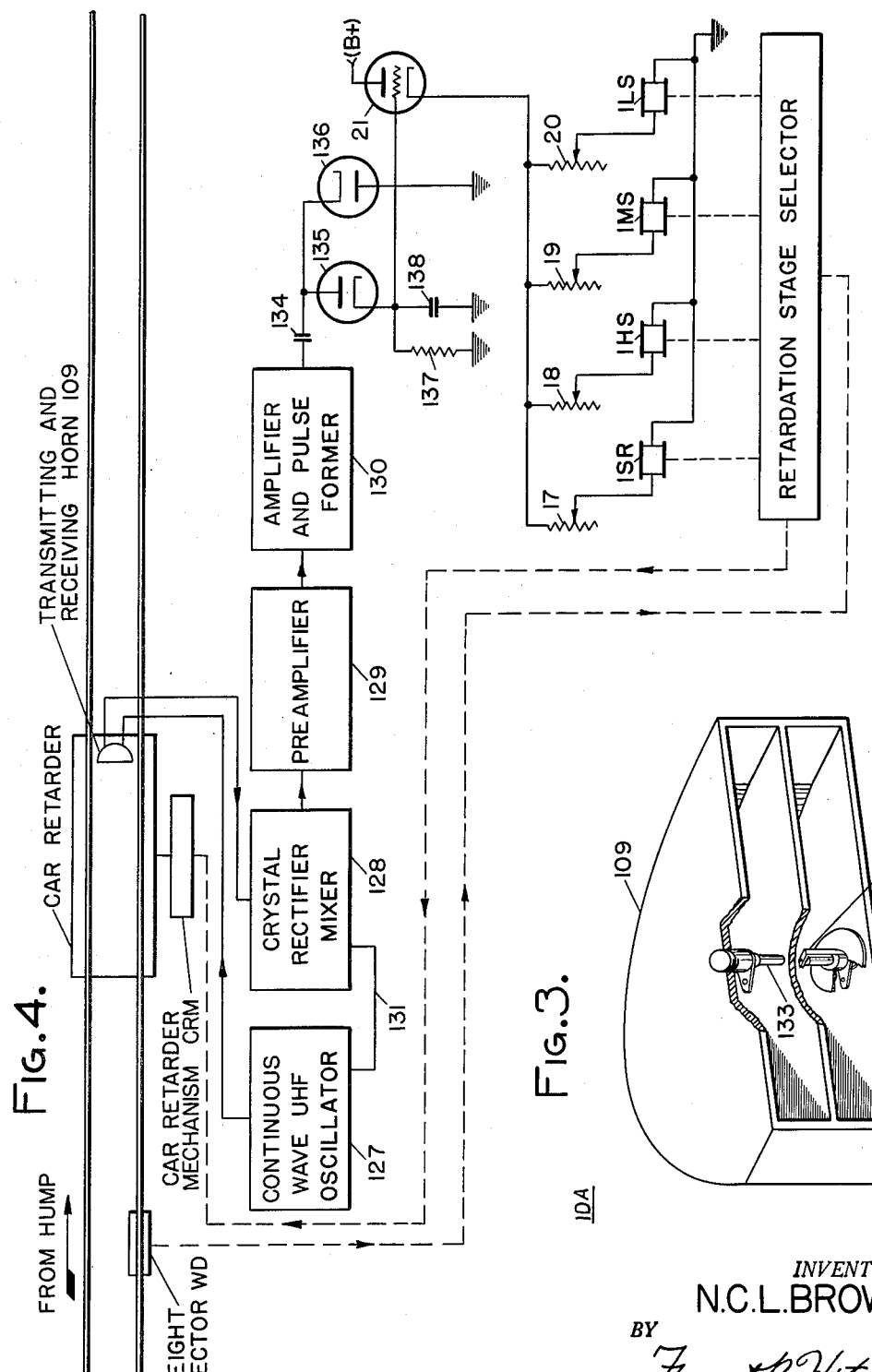

United States Patent Office 3,253,142
Patented May 24, 1966

3,253,142
CONTROL SYSTEM FOR TRACK BRAKES
Ned C. L. Brown, Scottsville, N.Y., assignor to General Signal Corporation, a corporation of New York
Continuation of application Ser. No. 359,052, June 2, 1953. This application Oct. 29, 1964, Ser. No. 412,276
13 Claims. (Cl. 246—182)

This application is a continuation of my prior application Ser. No. 359,052, filed June 2, 1953, now abandoned.

This invention relates to systems for the control of railway braking apparatus of the type comprising wheel engaging brake shoes located beside the track rails and movable toward and away from the rails into braking and nonbraking positions; and more particularly, this invention relates to the provision of an improved system for automatically controlling the degree of braking action in accordance with the speed and weight of a car passing through the braking apparatus.

The braking apparatus above mentioned is commonly known as a car retarder. These car retarders are employed in a classification yard for railway cars in conjunction with a hump over which the cars are pushed, so that as the cars are individually or in "cuts" allowed to accelerate down the hump, their speed of travel may be kept under the control of an operator in accordance with their weight and the particular destination of such car or cars. There are, of course, other conditions which the operator must take into consideration. For example, cars roll more freely in warm weather than they do in cold weather.

Since light cars must be given the greatest acceleration to reach the most distant destination in the classification yard, the hump is built high enough to cause such light cars to reach the proper speed. Car retarders are then added to reduce the speed of the heavier cars. Since the cars are switched from the main track coming over the hump to any one of a plurality of branch tracks to constitute different destinations, car retarders are included in certain of the branches as well as on the main track so that the cars may be properly controlled in accordance with the conditions relating to that branch of track selected for the destination of the car.

One of the problems of manually controlling the car retarders in such an organization is to determine the degree of retardation in accordance with the weight of the cars so that the initial setting of retardation for any given retarder will not be too great for the weight of the car and thus unduly reduce its speed below its proper speed of travel to reach its destination. It is proposed in accordance with the present invention to automatically select the degree of retardation in accordance with the weight of a car and to control the release of the car retarders in accordance with the speed necessary for that weight car to reach its destination, since a selection of a particular speed for a given weight car can be a more accurate gauge of the distance that the car will roll, or in other words its rolling resistance, than is the mere selection of a particular stage of retardation and release of the retarder in accordance with human judgment. The manner in which rolling resistance varies with car weight is well known in the art as is described, for example, in a paper entitled "Gravitation Yards" by J. C. Kubale, read to the Institute of Railway Signal Engineers, May 25, 1938 and published by Metropolitan-Vickers-GRS, Ltd., 132-135 Long Acre, London W. C. 2, special publication number 7618/1.

Generally speaking, and without any attempt to define the exact nature of the invention, it is proposed to provide a single weight detecting apparatus at the point in approach to the first retarder of a group and to select the degree of retardation for that retarder and each successive retarder of the group in accordance with the detection of the car weight. It is also proposed that suitable weight description transferring apparatus be employed so that the weight description can be transferred from the selecting apparatus of one retarder to the next as a car passes through the successive retarders of its group.

It is also proposed in accordance with the present invention to employ speed detecting apparatus individual to each retarder which is continuously responsive to the speed of the car passing through its retarder so that such retarder may be promptly released when the car has reduced its speed to the proper amount in accordance with its weight regardless of the location of the car in the retarder.

It is proposed that the speed detecting apparatus be of the type known as an "interferometer" which is commonly termed "radar." It is proposed that a separate interferometer will be provided for each retarder, and that it will be effective only a short distance in advance of its respective retarder.

Another characteristic feature of the present invention is to provide means for manually modifying the automatic means for selecting the speed at which a car retarder will be released for a given weight of car passing through a retarder. It is apparent that weather changes and other conditions may warrant a modification of the speed for any given weight of car at different times, and this modification of the speed selecting apparatus can be thus manually modified and allowed to automatically operate until conditions become different.

In addition, it is proposed that the operator will be provided with means for selecting whether any particular retarder shall act automatically or shall be under his direct manual control. In accordance with the present invention, the weight establishing control need be effective only if the speed responsive device for a particular retarder shows a speed above the releasing speed for the specified weight of the car then passing through the speed detecting or control zone.

It is also proposed that the control system of the present invention will release a retarder when a car speed has been reduced to the specified releasing speed for the weight of that car; and that when the retarder has thus been once released, it will not again become effective until that car has left the retarder and another car enters its control zone.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which:

FIG. 1 is a block diagram of the general layout and organization of the control system of the present invention;

FIGS. 2A and 2B when placed side by side, represent diagrammatically a control circuit organization for the control of two car retarder mechanisms;

FIG. 3 shows diagrammatically structure of a directional antenna; and

FIG. 4 shows a typical speed detector of the continuous wave radar type.

Figure 1:
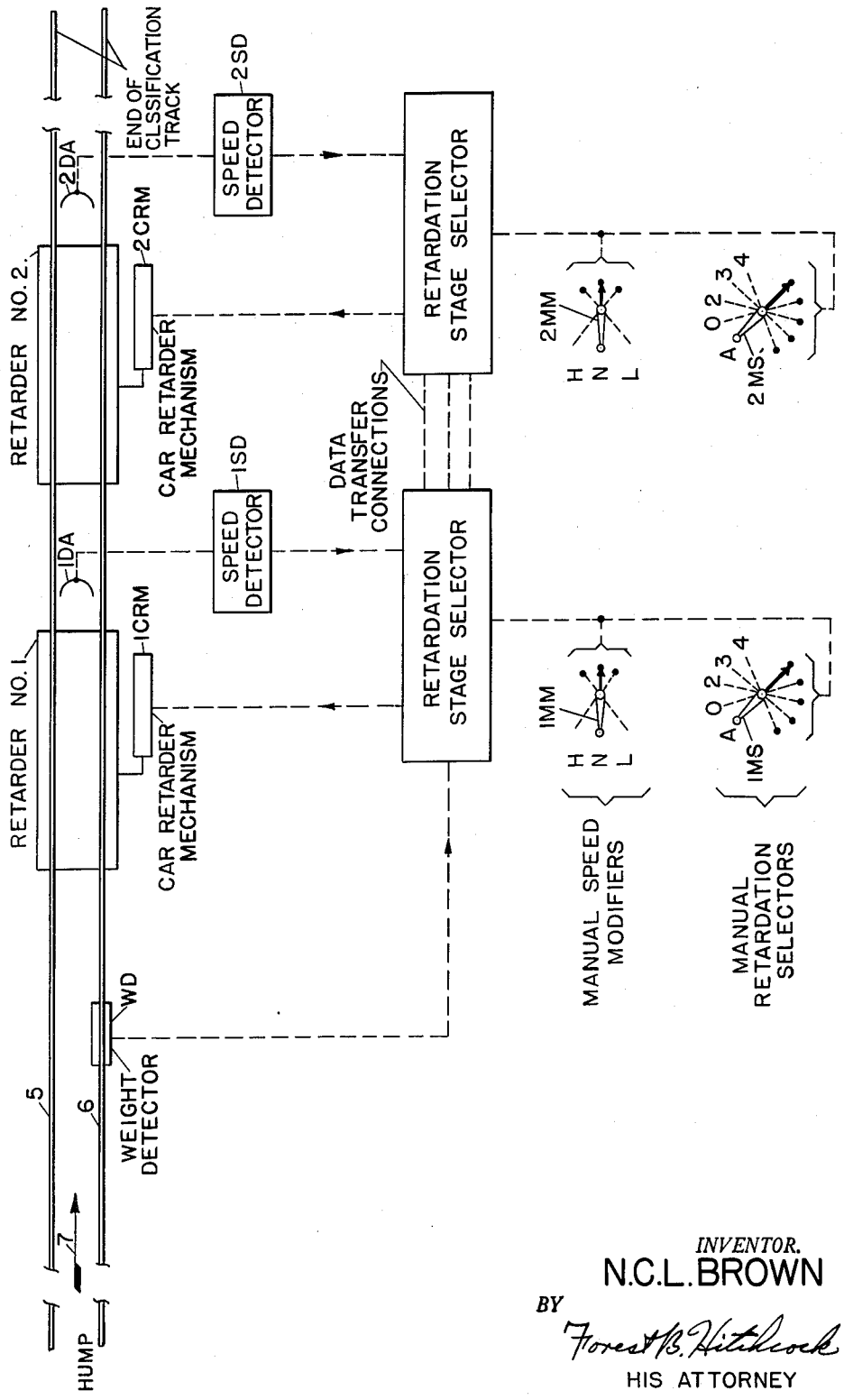

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and their contacts are illustrated in a conventional manner, and symbols are used to indicate connections to the terminals of batteries or other sources of electric current instead of showing all of the wiring connections to these terminals.

The symbols (+) and (−) are employed to indicate the positive and negative terminals respectively of suitable batteries or other sources of direct current; and the circuits with which these symbols are used, are assumed to always have current flowing in the same direction. The symbols (B+) and (B−) indicate connections to the opposite terminals of a suitable battery or other direct current source which has a central or intermediate tap designated (CN); and the circuits with which these symbols are used may have current flowing in one direction or the other dependent upon the particular terminal used in combination with the intermediate tap (CN). In this case, the center tap (CN) is also considered to be grounded, so that the symbols (B+) and (B−) may be used in combination with the center tap symbol (CN) or the usual ground symbol.

Referring to FIG. 1, the general layout of the organization contemplated by the present invention has been shown in block diagram. This general layout has not been arranged with the idea of showing the relative spacings or location of parts and units; but rather has been shown with the idea in mind of illustrating the functional relationships.

In a classification yard, a main track leading over and down the hump is usually arranged to divide into two or three main branches, which main branches are again divided into sub-branches. These sub-branches are then divided into destination tracks. In the provision of car retarders for such a yard, one retarder is usually located in the main track and is commonly known as the "hump retarder." The main branches are sometimes provided with retarder units and these are commonly known as the "intermediate retarders." The sub-branches are also provided with retarder units, and these are commonly known as "group retarders."

In the design of a classification yard, it is desirable to provide as much of the retardation as possible in the group retarders, omitting intermediate retarders whenever possible. This keeps the cars at a high speed of travel and hence with greater separation between successive "cuts" for switching purposes. Then the speed of the cars is reduced to the required degree when they are near their destinations. This increases the capacity of the yard with respect to the number of cars that can be classified in any given length of time. For this reason, intermediate retarders are employed only where the conditions are such that an intermediate degree of retardation is necessary. Most car retarder yards in addition to the group retarders do employ the hump retarder. This is because it is more economical to provide a single hump retarder than to provide additional amounts of retardation for each of the several group retarder units. Regardless of the particular design of the car retarder yard, it is often desirable to provide two or more car retarders for any one location as, for example, in the case of the hump retarder and/or the group retarder units.

In accordance with the present invention, the FIG. 1 illustrates in block form two car retarders, it being understood that any desired number of car retarders may be employed.

More specifically, two track rails 5 and 6 are shown as leading from a hump through two car retarders indicated in the drawing of FIG. 1 by blocks designated "Retarder No. 1" and "Retarder No. 2." Traffic in the form of cars, which are pushed up to the crest of the hump by a pusher engine, are released either individually or in cuts at the top of the hump and allowed to accelerate as they coast down the hump in the direction of the arrow. The two car retarders shown, may be located in either the main track or some branch track, and are assumed to be relatively close to each other. However, if it is expedient these retarders may be separated by any suitable distance, because in any case the general operation and function of the system remains the same.

The "Retarder No. 1" and the "Retarder No. 2" are respectively operated by the car retarder operating mechanisms designated in FIG. 1 by the blocks 1CRM and 2CRM. These car retarders and their respective operating mechanisms may be of any suitable type such as electrically operated car retarders, or pneumatically operated car retarders. In the present disclosure, it is assumed that the car retarders are electrically operated and may be of the type typically illustrated by the disclosure of Pat. No. 1,852,572 dated April 5, 1932.

In advance of the first retarder is a weight detector WD which may take any suitable form for operating a contactor to different positions in accordance with the weight of a car wheel passing over such weight detector, since the weight on one wheel is usually proportional to the weight of the whole car. This weight detector WD is illustrated in FIG. 2A of the drawings as having a plunger 8 associated with the track rail 6 so as to be operated by the passage of a car wheel over the weight detector section. This plunger 8 is biased upwardly by a spring 9 which is compressed upon the passage of a car wheel in accordance with the weight on that wheel. As shown the contacting element 10 is in a normal non-contacting position, but may be operated so as to make contact between a finger 11 and any one of three position contacts 13, 14, and 15. The completion of a connection between the common finger 11 and any one of the position contacts causes the energization of an appropriate relay for the weight of the car wheel then passing over the weight detector section.

As specifically shown, the position contact 13 provides an energizing circuit for the upper winding of the relay LW whenever a car of any weight passes over it, including the lightest empty car. The position contact 14 provides an energizing circuit for the upper winding of relay MW if a loaded car of medium weight passes over the detecting section. When a heavily loaded car passes over the detector section, the position contact 15 is closed which causes the energization of the upper winding of the relay HW.

This weight detector WD, of any suitable type, is located a suitable distance in advance of the first car retarder to allow for the operation of the control circuits and the car retarder operating mechanism; and this distance may be in the order of twenty to twenty-five feet depending upon the variables involved in the design of a yard layout.

At the exit end of each car retarder is a directional antenna which is connected to the receiving apparatus of a speed detector of the so-called "radar" type. As shown in FIG. 1, these directional antennas are 1DA and 2DA respectively associated with the speed detecting apparatus 1SD and 2SD.

The speed detectors are assumed to be of the continuous wave radar type employing the Doppler frequency principle discussed in general terms in Chapter 5 of the book entitled "Radar System Engineering" edited by Louis N. Ridenour and constituting volume 1 of the Radiation Laboratories Series published by the McGraw-Hill Book Company of New York. Each directional antenna in the system is assumed to have a structure diagrammatically shown in FIG. 3; and one suitable continuous wave radar type system is diagrammatically shown in FIG. 4.

It is to be understood that the directional antennas are located closely adjacent to the exit end of their respective retarders, and in some instances may be located within the retarder. The apparatus is also assumed to be capable of detecting the presence of the speed of a moving car when it comes within an appropriate distance such as seventy to seventy-five feet. It is assumed that the car retarders may be between thirty and fifty feet in length.

In this connection, it is desirable that the speed detector 1SD be capable of detecting the presence and speed of a car in advance of the directional antenna 1DA for a distance which will include the weight detecting section having a weight detector such as WD. This is because the weight registration is dependent upon the presence of a car being detected by the speed detector. Also, the speed detector 2SD with its direction antenna 2DA should be able to detect the presence and speed of a car in advance of the direction antenna 2DA for a distance which will include the "Retarder No. 1." This is because the weight registration for "Retarder No. 2" is dependent upon the detection of a car by the speed detector 2SD, and this registration for "Retarder No. 2" must be effected before the speed of the car has been reduced by "Retarder No. 1" and its associated control relays deenergized to release the retarder.

In this connection, it should be noted that the directional antennas detect the presence and speed of a car approaching them when the car is within an appropriate distance as above mentioned, and this detection continues until the car reaches the antenna and even while the car is passing over the antenna. This is because the portions of the car passing directly over the directional antenna merely provides radial reflections registering no speed, but the predominant number of reflections picked up by the direction antenna are from moving parts of the car still approaching the antenna. It can thus be seen that for a "cut" of cars the speed detector will be maintained active so long as there are any cars passing over its directional antenna.

More specifically, the speed detecting portion of the system is assumed to have micro-wave energy supplied to the directional antenna which energy is radiated toward the approaching vehicle. A portion of the energy striking the surface of the vehicle is reflected back to the directional antenna and supplied to a receiver. The transmitted and the reflected signals are received and mixed together so that the output beat frequency (Doppler frequency) signal of the mixer is of a frequency which is directly proportional to the speed of the vehicle. This output signal of the mixer is a sine wave. Assuming that the transmitted micro-wave frequency is in the order of 3000 megacycles per second, the mixer output frequency is approximately 35 cycles per second for the speed of a vehicle approaching at 4 miles per hour. For a vehicle approaching at 15 miles per hour this frequency is in the order of 135 cycles per second.

Suitable apparatus is provided to convert this Doppler frequency into a direct-current voltage which varies in direct proportion to the speed of the approaching vehicle. This voltage can then be applied to a cathode follower, such as at 21 of FIG. 2A, so that an adequate current output can be provided for the control of the selectively responsive relays, such as relays 1SR, 1LS, 1MS and 1HS in FIG. 2A. A similar cathode follower 22 and corresponding relays 2SR, 2LS, 2MS and 2HS are shown in FIG. 2B. In other words, the cathode follower 21, for example, provides an output current which is proportional to the voltage supplied to its grid which is, of course, proportional to the speed of the approaching vehicle. The higher the speed of the approaching vehicle the higher the current flow through the cathode follower 21. The selectively responsive relays are connected in multiple and each with its series resistors properly adjusted so that the different relays will pick up on different values of voltage in accordance with the variations of the output current of the cathode follower 21.

The speed detectors SD provide control data in accordance with the speed of the car, and the weight detector WD provides control data in accordance with the weight of the car which data is supplied to the retardation stage selector for the respective car retarders. Each retardation selector causes its operating mechanism to be positioned in accordance with the weight of that car and when the speed of the car has been reduced to the proper value for its weight, the retardation stage selector causes the release of the car retarder mechanism so that the retarder is caused to be operated to its zero or nonbraking position to allow the free travel of the car as it continues through the retarder.

Regardless of whether the car "Retarder No. 2" is closely adjacent to the car "Retarder No. 1" or is at some distance away, the weight control data is transferred to the retardation stage selector for the "Retarder No. 2" and the appropriate setting of the "Retarder No. 2" is effected and is maintained until the speed of a passing car through it has reduced to a speed appropriate for its particular weight. Such speed is, of course, detected by the speed detector 2SD which causes the release of the car retarder operating mechanism 2CRM allowing the continued free passage of that car. The control circuits and the retardation stage selector circuits for the retarder No. 1 are shown in FIG. 2A while the control circuits and the retardation stage selector circuits for "Retarder No. 2" are shown in FIG. 2B.

For the purposes of the present invention, the speed detectors have been shown in block form. Each speed detector is assumed to provide an output current varying in direct proportion to the speed of the car being detected. This current thus increases as the speed of the car increases; and since this current is supplied to a number of different relays which are included in multiple with different values of resistance respectively in series with them, the output current will divide proportionately to the resistance settings between the different branch circuits and any given relay will pick up only when the current through its branch circuit is sufficient to produce the pick-up voltage across that relay.

Referring to FIG. 2A the relays 1SR, 1HS, 1MS and 1LS are shown as being in different branch circuits connected to the bus 16 which received the output of the cathode follower 21. These relays have respectively associated therewith adjustable resistors 17, 18, 19 and 20 which may be set to determine the speeds at which these relays normally pick up. The resistor 17 is illustrated in a manner to indicate that there is very little added resistance in the circuit of the relay 1SR so that this relay 1SR is responsive to a relatively low speed, which is assumed to be in the order of 1 or 2 miles per hour. Of course, the output of the cathode follower 21 for higher speeds is such that the relay 1SR will also be effectively energized for all higher speeds. The resistor 18 is set so that the relay 1HS will be effectively energized only for the highest speeds. The resistor 19 is set so that the relay 1MS will be effectively energized only for the medium speeds and the higher speeds. The resistor 20 is set so that the relay 1LS will be effectively energized for the low speeds and all higher speeds. It is also understood that these adjustable resistors 18, 19 and 20 may be set for varying conditions such as when the retarder being controlled is to govern the speed of cars for tracks on a curve, since it is a well known fact that the rolling resistance of a car on a curve is higher than for a straight track. Thus these resistors can be adjusted in accordance with the characteristics of the classification track to which a car may be directed.

In addition, resistors 24, 25 and 26 are associated with relays 1L and 1H and controlled by their contacts so that the response of the speed relays 1HS, 1MS and 1LS may be manually modified in accordance with varying conditions. The relay 1L is energized when the modifying lever 1MM is moved from its normal position N to the position L. This picks up the contacts 27, 28 and 29 of relay 1L to wholly shunt out the resistors 24, 25 and 26 respectively. The removal of the resistance from each of the branch circuits causes the relays 1HS, 1MS and 1LS to all be responsive to relatively lower speeds.

On the other hand the movement of the manual modifying lever 1MM to the position H energized the relay 1H causing the opening of its contacts 30, 31 and 32 which inserts added resistance of each of the resistors 24, 25 and 26 respectively. This inclusion of added resistance in each of the branch circuits causes the relays 1HS, 1MS and 1LS to be responsive to relatively higher speeds than the normal settings.

Similar resistors and control is provided for the relays 2SR, 2LS, 2MS and 2HS in FIG. 2B, and its operation will be understood by analogy to the description of FIG. 2A.

Each retardation stage selector besides the relays already described, includes a transfer relay, such as relays 1TN and 2TN, which picks up when the speed of a car has been detected as being of such a value as requiring retardation of that car, and this transfer relay is maintained picked up until the car has actually left the retarder, and the associated speed detector no longer provides an output sufficient to maintain the associated relay 1SR or 2SR picked up. In brief, the transfer relays tend to hold the established conditions for transfer purposes. Relay 2E cooperates with relay 2N to perform the transfer operation in a positive fashion.

Each car retarder operating mechanism such as 1CRM in FIG. 2A is indicated as having four lead-in wires connected to buses 0, 2, 3 and 4 respectively and also a common connection to (—). The usual car retarder operating mechanism has five positions, but it has been found in practice that this large number of positions is not required. For this reason, position No. 1 giving the least retardation, has been omitted from this disclosure. The position 0 (zero) is, of course, the position where no retardation is provided. The manual selecting lever 1MS provides that (+) is supplied to a bus 34 when the lever 1MS is in the automatic position A. When the lever is in this position, the degree of retardation is then determined by the relays 1HS, 1MS and 1LS; but, when the lever 1MS is operated to any of its positions 0, 2, 3 and 4, then the degree of retardation supplied by the car retarder mechanism 1CRM is determined by its position.

It is believed that the nature of the invention, its advantages and characteristic features can be best understood with further description being set forth from the standpoint of typical operations.

OPERATION

Under normal conditions, the operator will have the levers 1MS and 2MS set in their positions A to provide automatic operation of the associated retarders. Also, assuming that other conditions are normal, the manual modifying levers 1MM and 2MM will be set in their respective normal positions N.

With no cars present, the speed detectors 1SD and 2SD will not be supplying any output. This is because there is no voltage supplied to the grids of the respective cathode followers 21 and 22 when there is no approaching car. In other words, the respective cathode followers are maintained nonconductive by reason of the normal negative bias on their respective control grids.

Let us assume that a car is pushed over the hump and passes the weight detector WD. Assuming that this car is lightly loaded, then the plunger 8 moves the contact 10 into a position to complete the circuit from (+) through contacts 11, 10 and 13 to energize the upper winding of the relay LW. At this time the car is assumed to be within the range of the speed detector 1SD, and it is probably travelling sufficiently fast to cause the relay 1SR to be picked up. Thus, as soon as the relay LW is picked up, a stick circuit is closed from (+) through a circuit including back contact 35 of relay 1TN, back contact 36 of relay HW, back contact 37 of relay MW, front contact 38 of relay LW, front contact 39 of relay 1SR, lower winding of relay LW to (—).

This closure of a stick circuit for the relay 1LW maintains it picked up even though the passage of successive wheels over the weight detector WD may intermittently open and close the contacts 11–13.

Since the car is assumed to be lightly loaded, the releasing speed for the Retarder No. 1 will be relatively high. Likewise the releasing speed of Retarder No. 2 will be relatively high, but may be slightly lower than the releasing speed for Retarder No. 1. Let us assume that these two releasing speeds are respectively 10 miles per hour and 8 miles per hour for the Retarders No. 1 and No. 2.

Assuming that the car is travelling at some speed at least slightly above the releasing speed of 10 miles per hour, then the speed detector 1SD provides an output which is sufficient not only to cause the pick up of relay 1SR, but also to cause the pick up of relay 1HS. This pick-up circuit extends from (B+), through cathode follower 21, bus 16, resistor 24 partially shunted by back contact 30, resistor 18, back contact 40 of relay 1LS, back contact 41 of relay 1MS, back contact 42 of relay 1TN, front contact 43 of relay LW, back contact 44 of relay MW, back contact 45 of relay HW, windings of relay 1HS, to ground. As soon as this relay 1HS picks up, front contact 46 is closed to shunt out the contacts 42, 43, 44 and 45. For this reason, the relay 1HS remains picked up dependent upon the continued detection of a car approaching at a speed above 10 miles per hour.

When the relay 1HS picks up, it creates a supplemental stick circuit for the relay LW from (+), through a circuit including front contact 47 of relay 1HS, front contact 48 of relay LW, front contact 39 of relay 1SR, lower winding of relay LW to (—). At the same time, the closure of front contact 49 of relay 1HS applies energy to the bus 50 which energized the transfer relay 1TN through an obvious circuit. The picking up of the relay 1TN closes a stick circuit from (+), through a circuit including front contact 51 of relay 1SR, front contact 52 of relay 1TN, windings of relay 1TN, to (—).

As soon as relay 1TN picks up, a circuit is then closed for causing the car retarder operating mechanism 1CRM to operate the Retarder No. 1 to its second stage of retardation. This is effected by reason of a circuit closed from (+), through lever 1MS in position A, wire 34, front contact 53 of relay 1TN, front contact 54 of relay 1HS, bus 2 to the operating mechanism 1CRM, to (—). This sets the Retarder No. 1 in readiness for the entrance of the car into its braking zone.

The picking up of the relay 1HS and application of energy to the bus 50 does not at this time cause a transfer of the weight information to the retardation stage selector for Retarder No. 2 because it is assumed that the speed detector 2SD does not have sufficient range to pick up the approach of the car prior to its entrance into Retarder No. 1.

When the car enters the Retarder No. 1, it is decelerated. When such deceleration reduces the car to the release speed for that weight car such as ten miles per hour, the relay 1HS is dropped away to close a circuit from the bus 34 and front contact 53 of relay 1TN through back contact 54 of relay 1HS, back contact 55 of relay 1MS and back contact 56 of relay 1LS to the position bus 0 of the car retarder operating mechanism 1CRM. This immediately releases the Retarder No. 1 and allows the car to continue at its then existing speed.

However, prior to the release of the relay 1HS and upon the entrance of the car into the Retarder No. 1, the speed detector 2SD detects the speed of the car and effects the picking up of its relay 2SR. As soon as relay 2SR closes its front contact, the relay 2E is picked up by reason of energy from front contact 49 over bus 50, through front contact 57 of relay 2SR, back contact 58 of relay 2TN, windings of relay 2E to (—). The picking up of this relay 2E closes its own front contact 73 to shunt out back contact 58 of relay 2TN. It also closes its front contact 72 thus completing the energizing circuit for relay 2HS, which immediately picks up since the speed of the car is above its releasing speed such as eight miles per hour. This energizing circuit for relay 2HS is completed from (+), through cathode follower 22, bus 59, resistor 60 shunted by back contact 61 of relay 2H, resistor 62, back contact 63 of relay 2LS, back contact 64 of relay 2MS, back contact 65 of relay 2TN, wire 66, front contact 67 of relay 1HS, back contact 68 of relay 1MS, back contact 69 of relay 1LS, wire 70, front contact 71 of relay 2SR, front contact 72 of relay 2E, winding of relay 2HS, to ground.

When the relay 2HS picks up, it closes front contact 75 to shunt out most of the contacts included in its pick-up circuit. It closes front contact 76 to apply energy to the transfer relay 2TN through an obvious circuit. As soon as the relay 2TN picks up its stick circuit is closed from (+), through front contact 77 of relay 2SR, front contact 78 of relay 2TN, windings of relay 2TN, to (—). Also, the picking up of the relay 2TN completes the circuit for causing the car retarder 2CRM to operate the Retarder No. 2 to its second stage of retardation. This circuit is closed from (+), through lever 2MS, in its position A, front contact 80 of relay 2TN, front contact 81 of relay 2HS, to the position bus 2, car retarder operating mechanism 2CRM, to (—).

When the car enters the Retarder No. 2 and is decelerated to the release speed for that weight car, such as eight miles per hour, the output of the speed detector 2SD is below the value to maintain the relay 2HS picked up. The release of relay 2HS immediately applies energy through back contacts 81, 82, and 83 to the position bus 0 of the operating mechanism 2CRM, so that the Retarder No. 2 is immediately released.

As the car passed through the Retarder No. 1, the relay 1SR was maintained picked up although the relay 1HS was dropped, and the release of the relay 1SR does not take place until the car passes the speed detecting antenna 1DA so that there is no longer a speed of approach. The release of the relay 1SR opens its front contact 51 and deenergizes the transfer relay 1TN. But it should be noted that the weight relay LW is already released because the front contact 47 opened when relay 1HS released. Thus, the release of the relay 1TN merely restores the organization of the retardation stage selector for Retarder No. 1 to its normal condition.

As the car passed through the Retarder No. 2 and released the relay 2HS, the relay 2SR remains picked up until the car passes the speed detector directional antenna 2DA, at which time the opening of contact 77 deenergizes the transfer relay 2TN. It is noted that the relay 2E drops away when the relay 1HS drops away and removes energy from bus 50.

In this way, the car is caused to decelerate to ten miles per hour in the Retarder No. 1 and to eight miles per hour in the Retarder No. 2, the retarders in each case being fully opened when the proper speed reduction has been made.

In connection with the releasing speeds, it is convenient to show such speeds with respect to the two retarders and the different ranges of loads in table form. It is, of course, to be understood that the values given in this table are approximations, since any actual values will be determined by the particular design of the classification yard. Also, in the above description and in the table given below, it is assumed that the two different retarders may be spaced from each other and that the second retarder requires a lower releasing speed for a particular weight car than does the first retarder. However, in some instances, particularly when the retarders are immediately adjacent each other, it may be desirable to have the releasing speeds for each different weight the same for both retarders. Obviously, this is merely a selection of the desired speeds for the different weights in accordance with the requirements of practice. This latter arrangement is particularly useful where it is impossible to obtain enough retardation with one retarder unit to always reduce the speed of the cars to the desired value. This arrangement is also more adaptable for multiple retarders at the hump location where the spacing of the cars may be relatively close together.

*Retarder releasing table*

| Range of Load and Storing Relays | Releasing Speed Retarder No. 1 | | Releasing Speed Retarder No. 2 | |
|---|---|---|---|---|
| | | M.p.h. | | M.p.h. |
| Ten tons up to forty tons picks up relay LW. | High | 11 | High | 9 |
| | Normal | 10 | Normal | 8 |
| | Low | 9 | Low | 7 |
| Forty tons up to seventy tons picks up relay MW. | High | 10 | High | 8 |
| | Normal | 9 | Normal | 7 |
| | Low | 8 | Low | 6 |
| Seventy tons and over picks up relay HW. | High | 9 | High | 7 |
| | Normal | 8 | Normal | 6 |
| | Low | 7 | Low | 5 |

In the above table the high and low releasing speeds are andicated for the different retarders which are obtained by the operation of the respective manual speed modifying levers 1MM and 2MM to their respective high and low positions H and L. It should also be understood that the degree of modification indicated in the table is merely for illustrative purposes, since the actual values would depend upon various different conditions. For example, one classification yard might be located in a region that has wide temperature changes which would correspondingly affect the rolling of the cars. This would require greater modification of the releasing speeds, than would a similarly constructed yard located in a region of mild climate with narrow temperature fluctuations. Another factor to be considered is the direction of the prevailing winds and the value of the average wind velocity for the particular location. For these reasons, it will be clear that the manual speed modification provided by each lever will be selected dependent upon the circumstances of practice.

In the above operation, it was assumed that the manual speed modification levers were in normal positions, and that the car passing through the retarders had a light load, i.e. something under forty tons; and for this reason the normal release speeds for the respective Retarders Nos. 1 and 2 were referred to. But, of course, it is to be understood that one or both of the manual speed modifying levers could be operated to change the releasing speeds according to the various conditions above discussed.

Also, the above described operation assumed that the car passed the weight detector WD at a sufficient speed to cause the immediate establishment of the releasing speed for the first retarder. However, it should be recognized that the passage of a car over the hump, particularly in the higher ranges of weight, will not immediately give the car all of the acceleration which it will receive by the time it reaches the retarder. This is because there is a slope in the track which continues from the hump. This slope is of such a degree as required for the size of the yard. Since the relay 1SR is picked up for a relatively low speed, the particular weight relay such as LW is stuck through a circuit previously traced including back contact 35 of relay 1TN. This has the advantage that the relay LW, for example, is maintained steadily energized for the successive wheels of successive trucks and is in readiness to cause the response of the relay 1HS as soon as the car reaches the proper speed.

There is also another advantage which is more apparent when it is considered that several cars may be coupled together and passing over the hump together as a so-called "cut." Let us assume that there are two cars in the "cut," and that the second car is heavier than the first car. Under these circumstances, it is likely that the cars will not attain the speed required to pick up the relay 1HS while the first car is passing over the weight detector WD, but as soon as the first wheels of the second car pass over the weight detector, it will cause the energization of the relay MW; and for such a medium weight the cars may then be going fast enough to pick up the relay 1MS and thus establish the degree of retardation for the heavier weight car.

This operation will be best understood by considering the detailed operations of the system under these circumstances.

DIFFERENT WEIGHT CARS IN SAME "CUT"

Let us assume that the light weight car has passed over the weight detector and picked up the weight storing relay LW as previously described. It is being maintained energized by reason of a stick circuit including its own front contact 38 and back contact 35 of relay 1TN. But as above mentioned, the speed of the cars is insufficient to cause the picking up of the high speed responsive relay 1HS.

As soon as the first wheels of the second medium weight car pass over the weight detector, the circuit is completed between contact finger 11 and the contact finger 14 causing the energization of the relay MW. The picking up of relay MW opens the stick circuit for the relay LW at back contact 37, and at the same time, establishes a stick circuit for the relay MW from (+), through a circuit including back contact 35 of relay 1TN, back contact 36 of relay HW, front contact 37 of relay MW, front contact 86 of relay 1SR, lower winding of relay MW, to (−).

The picking up of the relay MW opens back contact 44 preventing any further possibility of the relay 1HS being picked up. The closure of front contact of relay MW completes a circuit for picking up relay 1MS since the cars will undoubtedly be travelling faster than the releasing speed for cars of medium weight. This pick up circuit for the relay 1MS is closed from (B+), cathode follower 21, resistor 25 and back contact 31 of relay 1H, resistor 19, back contact 87 of relay 1LS, back contact 88 of relay 1TN, front contact 89 of relay MW, back contact 90 of relay HW, windings of relay 1MS, to ground. As soon as the relay 1MS picks up, it closes its front contact 91 and shunts out the contacts 88, 89 and 90 so that it is wholly dependent upon the speed at which the cars are detected by the speed detector 1SD. The closure of front contact 92 completes an auxiliary stick circuit for the relay MW through its front contact 93.

Also, the closure of front contact 94 energizes the relay 1TN by applying (+) to the bus 50. As soon as relay 1TN is energized its stick circuit including front contact 51 of relay 1SR is closed. Also, the closure of front contact 53 of relay 1TN applies energy through back contact 54 and front contact 55 to the position bus 3 causing the car retarder mechanism 1CRM to be operated to its third stage of retardation.

As the cars pass through the Retarder No. 1, and are reduced in speed to the releasing value, the relay 1MS will be deenergized below its drop away value and it will drop its contacts and release the retarder to a fully open or zero position. But before this has happened, the application of energy to the bus 50 causes the relay 2E of FIG. 2B to be energized as soon as the cars come within range of the speed detector 2SD. Since the speed detector 2SD can detect the speed of cars in the Retarder No. 1, the relay 2SR is picked up which in turn allows the relay 2E to pick up and cause the energization of the proper speed relay.

More specifically, the pick-up circuit for the relay 2MS is closed from (B+), cathode follower 22, bus 59, back contact 95 of relay 2H, resistor 96, resistor 97, back contact 98 of relay 2LS, back contact 99 of relay 2TN, wire 100, front contact 101 of relay 1MS, back contact 102 of relay 1LS, wire 103, front contact 104 of relay 2SR, front contact 105 of relay 2E, windings of relay 2MS to ground. As soon as relay 2MS becomes energized, it closes its front contact 106 to complete a stick circuit rendering that relay wholly dependent upon the speed detected by the speed detector 2SD.

The closure of front contact 107 of relay 2MS energizes the relay 2TN so that it picks up and closes its own stick circuit previously described. This closes front contact 80 to supply energy to front contact 82 so that the Retarder No. 2 will be operated to its third stage of retardation by the operating mechanism 2CRM. As the cars pass through the Retarder No. 2 and are reduced in speed to the releasing speed, which in this case is indicated as being seven miles per hour in the table, the relay 2MS is released and the car retarder is operated to its open or zero position.

In each instance, the passage of cars over a retarder maintains the slow speed relay SR energized until the cars have completely passed the directional antenna for that retarder. Thus, for a long string of cars, the relay 1TN or 2TN, as the case may be, is maintained picked up.

In the above description, the second car of the "cut" was assumed to be of medium weight, but it could have just as well been a heavy weight car in which the relay HW would have been picked up causing the corresponding release speed control to be established. This operation will not be described in detail since it is so closely analogous to the operation just pointed out.

Let us assume that a "cut" of cars includes two light cars and perhaps three very heavy cars following the light cars. In this case, the light cars would have their weights detected and cause the picking up of the relay LW; but the heavy weight cars would hold the light cars back so that their speed would not be sufficient to pick up the relay 1HS as detected by the speed detector 1SD. In this case, the retarder mechanisms would not be set until the first heavy car passed over the weight detector at which time the relay HW would be picked up by a circuit closed from (+), through contact 11, contact 10, contact 15, upper winding of relay HW, to (−). The relay 1SR would, of course, be picked up even for the low speed at which such "cut" of cars is travelling. For this reason, the relay HW would be stuck up by a circuit closed from (+), and including back contact 35 of relay 1TN, front contact 36 of relay HW, front contact 110 of relay 1SR, lower winding of relay HW, to (−). This picking up of relay HW and opening of back contact 36 opens the stick circuit for the relay LW.

As soon as the relay HW closes its front contact 111, there is an energizing circuit for the relay 1LS since the "cut" of cars is assumed to be travelling at a speed above the release speed for such heavy weight cars. This pick-up circuit is closed from (B+), through the cathode follower 21 of the speed detector 1SD, resistor 26 in part shunted by back contact 32 of relay 1H, resistor 20, back contact 112 of relay 1TN, front contact 111 of relay HW, winding of relay 1LS, to ground. As soon as relay 1LS picks up, it closes its front contact 113 to maintain it picked up dependent upon the speed detected. Also, the closure of front contact 114 completes an energizing circuit over bus 50 for the relay 1TN which picks up and sticks through its front contact 52 as previously described. Also, the closure of front contact 56 of relay 1LS applies the energy to the bus 4 for setting the car retarder mechanism to the fourth degree of retardation.

The closure of front contact 115 of relay 1LS completes a pick-up circuit for the relay 2LS following the response of the relay 2E and assuming that the relay 2SR has been picked up since the speed of the "cut" of cars has been detected by the speed detector 2SD. Assuming that the speed of the "cut" of cars is above the release speed for the Retarder No. 2 for heavy weight cars, then the relay 2LS is energized by a circuit closed from (B+), through the cathode follower 22 of the speed detector 2SD, resistor 116 in part shunted by back contact 117 of relay 2H, resistor 118, back contact 119 of relay 2TN, wire 120, front contact 115 of relay 1LS, wire 121, front contact 122 of relay 2SR, front contact 123 of relay 2E, winding of relay 2LS, to ground. As soon as the relay 2LS picks up, it closes front contact 124 to render it dependent upon the releasing speed of the speed detector 2SD.

It will now be readily understood that as the "cut" of cars passes through the retarders, they will be respectively released providing such cars are reduced in speed to the respective releasing speeds for their weight class.

There is still another combination of circumstances involving different weight cars. Let us assume that a "cut" of cars involving two medium weight cars and two heavy weight cars approaches the first retarder. The medium weight relay MW is picked up to register the weight in the usual way. But assuming that the speed of the cars is above the release speed for medium weight cars, the relay 1MS is picked up to establish the retardation for medium weight cars. This relay 1MS, in turn, causes the relay 2MS to be picked up as soon as the presence of the cars is detected by the speed detector 2SD. However, the degree of retardation provided by the retarders in position 3 is insufficient to substantially reduce the speed of the cars due to the very heavy weight cars. In this instance, as soon as the first heavy weight car is detected by the weight detector WD, the relay HW is picked up. This causes a circuit for the pick up of the relay 1LS which includes front contact 125 of relay MW. The picking up of the relay 1LS opens back contact 87 releasing 1MS, while the closure of its front contact 56 establishes a circuit for causing the car retarder mechanism 1CRM to operate the Retarder No. 1 to its fourth position (greatest retardation). Likewise, the closure of front contact 115 of relay 1LS while the relay 1MS is still picked up (i.e. while it is releasing following the opening of back contact 87), completes a circuit through front contact 126 for the picking up of relay 2LS and establishing the car Retarder No. 2 in its position No. 4.

In other words, the circuits are arranged so that when a heavier car is included in a "cut" of cars, it can cause the establishment of a higher degree of retardation. If the "cut" of cars is reduced in speed by the retarders to the release speed for that particular heavy weight of cars, the retarders are released; otherwise the "cut" continues on through the retarders being decelerated to whatever extent the retarders can accomplish.

In the above description, it was pointed out how a heavy weight car might cause the shift in the retardation established from a medium weight car to a heavy weight car. A similar shift in retardation can be made from a light weight car to a medium weight car; but this will not be described in detail since it will be readily understood by analogy to the description given above. But it should be understood that a light weight car cannot cause a shift in the retardation from that for a medium or heavy weight car.

ESTABLISHING RETARDATION FOR SUCCESSIVE CARS

It was pointed out above that each speed detector is arranged to detect a car when it comes within its zone of detection and such detection is maintained until the car passes the associated directional antenna. The circuit organization is such that when a degree of retardation has been established for a first car which is still passing through Retarder No. 2, that setting is maintained until such first car passes beyond the directional antenna for that retarder. However, in the meantime a following second car may cause the setting of the Retarder No. 1; but this is dependent upon the two cars being spaced apart a sufficient distance so that the speed detector 1SD releases the relay 1SR and drops the relay 1TN before the second car is detected. When this happens the relay 2E is also released even though the relay 2SR is being held up by the first car which is still in the Retarder No. 2.

When the second car is detected by the speed detector 1SD and its weight is registered by the weight detector WD, the relays for the first retarder are properly selected. But regardless of which relay 1HS, 1MS or 1LS is picked up, it cannot cause the picking up of the relay 2HS, 2MS or 2LS until the relay 2TN has been dropped away to allow the repicking up of the relay 2E. Thus, it will be seen that the spacing of the two cars must be sufficiently far apart to in the first place allow the release of the relays 1TN and 2E, and in the second place to allow the relay 2SR to drop away and release relay 2TN before the second car is detected by the speed detector 2SD. In this way, successive cars can be given distinctive degrees of retardation without interfering with each other.

It should also be noted that by the use of the manual modifying levers a large number of combinations of release speeds may be applied to different cars, and these different release speeds may be set up at any time.

SPEED DETECTION APPARATUS

FIG. 3 illustrates a directional antenna, such as 1DA, as constituting a transmitting and receiving horn 109 having two compartments, the lower compartment being for transmission and the upper compartment being used for reception. The receiving compartment has a short whip type antenna 133 extending into it with a proper length corresponding to one fourth the wave length being employed. Similarly, the transmitting compartment has folded ground plane antenna 132 extending into it to an extent corresponding to one fourth the wave length of the frequency employed.

Referring to FIG. 4, the speed detector apparatus is shown as including a continuous wave UHF oscillator 127 which is connected to the transmitting antenna 132 through a suitable coaxial cable. As previously mentioned, the frequency of this oscillator 127 in the order of three thousand megacycles so that the associated antenna 132 is relatively short.

The receiving antenna 133 is connected through a suitable coaxial cable to the crystal rectifier mixer 128. This receiving antenna 133 picks up reflected waves from an approaching car, which waves have been transmitted by the transmitting antenna 132. A small output from the oscillator 127 is supplied to the mixer 128 through the connection 131. Thus, both the transmitted and received frequencies are supplied to the mixer 128. These two different frequencies are acted upon by the mixer 128 in a way to give an output beat frequency equal to the difference of the two frequencies. This beat frequency is known as the Doppler frequency because it is directly proportional to the speed of the approaching vehicle.

The output beat frequency of the mixer 128 is supplied to the preamplifier 129 which in turn provides an input to the amplifier and pulse former 130. The input frequency to the amplifier and pulse former 130 is a sine wave, and as stated above, varies in direct proportion to the speed of an approaching vehicle. For example, a vehicle approching at approximately four miles per hour provides a beat frequency of approximately 35 cycles per second; whereas, a vehicle approaching at fifteen miles per hour provides a beat frequency of approximately 135 cycles per second. This, of course, assumes that the transmitter frequency is in the order of three thousand megacycles per second.

The amplifier and pulse former 130 takes the input and creates a series of positive pulses at a rate corresponding to the frequency of the input. These positive pulses are applied through a capacitor 134 to the plate of diode 135 and also to the cathode of diode 136 having its plate connected to ground. The clamping diode 136 assures the elimination of any negative pulses so that the voltage at the plate of diode 135 is clamped to the ground level. Any attempt of the input pulses to lower this voltage below ground causes the capacitor 134 to charge through cathode follower 135. Therefore, each positive pulse causes the plate of diode 135 to be raised above ground by an amount equal to the peak of such positive pulse. The raising of the plate voltage of diode 135 causes this tube to become conductive so that capacitor 138 becomes charged. The amount of charge transferred to capacitor 138 in response to each positive input pulse is determined by the amplitude of such pulse.

The parallel resistor 137 provides a local discharge path for capacitor 138. The amount of charge added to the capacitor 138 by each input pulse is also affected by the voltage appearing at that instant across capacitor 134, since a pulse of a given amplitude will be less effective to add an amount of charge to the capacitor 134 when it is charged to a positive voltage than when the condenser 134 is fully discharged. Also, the discharge of capacitor 138 through resistor 137 between pulses increases as the voltage across the capacitor increases.

For any given rate of input pulses, an equilibrium condition is reached at which the amount of charge lost by the capacitor 138 through the resistor 137 between successive input pulses equals the amount of charge added to the capacitor 138 by each input pulse. The amplitude of the positive voltage across capacitor 138 for this equilibrium condition therefore varies in accordance with the repetition rate of the input pulses and is a maximum when the repetition rate is a maximum.

The voltage appearing across the capacitor 138 is applied directly to the grid of tube 21 which is connected as a cathode follower with its cathode load resistance comprising a plurality of parallel connected relays, each provided with a series resistance. The amount of current which flows through the cathode follower 21 and its parallel load circuits is, of course, proportional to the voltage across capacitor 138. It has been described above how the current through tube 21 divides between the relays 1SR, 1HS, 1MS and 1LS in proportion to the settings of their respective resistors and this will not be repeated in detail. The response of these relays to the presence and the speed of an approaching vehicle acts through the retardation stage selector as above described, to control the setting of the associated car retarder mechanism CRM.

Although this general description of one specific form of speed responsive device has been given for the purpose of definiteness in the present disclosure, it is to be understood that any equivalent speed responsive means may be employed.

Having described a car retarder control system as one specific embodiment of the present invention, it is desired to be understood that this form is selected to facilitate in the disclosure of the invention rather than to limit the number of forms which it may assume; and, it is to be further understood that various modifications, adaptations, and alterations may be applied to the specific form shown to meet the requirements of practice, without in any manner departing from the spirit or scope of the present invention.

What I claim is:

1. In an organization for the control of car retarders in a classification yard, a plurality of car retarders along a track, a weight detector in approach to the first of said retarders, a plurality of weight storing relays selectively energized in accordance with the weights of each car passing said weight detector, means controlled by said relays for selecting the initial degree of retardation for each of said retarders in accordance with the weight of the car before it enters its respective retarder, a speed detector adjacent each of said retarders for continuously responding to the speed of a car passing through its respective retarder, and means controlled by said speed detector for each retarder for releasing that retarder when a car passing through it has reduced its speed below a value selected for that retarder in accordance with its weight, the speed at which the successive retarders are released being successively lower for any given weight car.

2. In an organization for the control of car retarders in a classification yard, a first and a second car retarder along a track, a weight detector in approach to the first of said retarders, an interferometer of the radio frequency type for each of said retarders and each having a directional antenna adjacent the exit end of its respective retarder, the zone of detection for the first retarder extending through the retarder and including said weight detector, and the zone of detection for the second interferometer extending through both said first and second retarders, relay means for registering the weight of an approaching car as detected by said weight detector only providing that car is detected by said first interferometer, said means establishing the initial degree of retardation for that retarder providing the car is travelling at a speed higher than the speed at which that weight car should travel, said means also acting to release said retarder when a car passing through it has its speed reduced below the value at which that weight car should travel, and means controlled by said second interferometer for establishing the degree of retardation of said second retarder in accordance with the weight of the car then passing through said first retarder only providing said second interferometer detects its presence and only providing the speed of that car is higher than the speed at which that car should travel through said second retarder, said means acting when the car has been reduced below the speed at which it should travel in accordance with its weight to operate said second retarder to a position releasing that car.

3. In an organization for the control of car retarders in a classification yard, a car retarder located along a track and operable to a plurality of different positions including a released position and a number of positions for engaging the wheels of a passing car with different degrees of pressure to effect the deceleration of a car passing through it at a rate in accordance with the pressure with which the retarder then engages the wheels of such car, control means for operating said retarder to any selected one of its different positions, a weight detector in approach to said retarder, circuit means controlled by said weight detector for acting on said control means to initially operate said retarder to a particular wheel engaging position for an approaching car, a speed detector of the radio frequency type located adjacent said retarder and continuously responsive to the speed of a car passing through said retarder, and circuit means controlled by said speed detector for acting on said control means only after the actuation of said weight detector for causing said retarder to be operated to appropriate positions in accordance with the speed of a passing car.

4. In an organization for the control of car retarders in a classification yard, a car retarder along the track operable to provide different degrees of retardation, a weight detector in approach to said retarder, a radar type speed detector adjacent said retarder for continuously detecting the speed of a car passing through said retarder, circuit means jointly controlled by said weight detector and said speed detector for initially selecting the degree of retardation applied by said retarder in accordance with the weight of such car before it enters said retarder providing said car is travelling above a particular preselected speed value for its weight, manually operable means for at times acting on said speed selecting means to modify said preselected speed to a value different than said particular value, and circuit means controlled by said speed detector for causing said retarder to be operated to a non-wheel engaging condition when the speed of the car has been reduced by said retarder to said value then preselected.

5. In an organization for the control of the speed of cars passing through a classification yard to effect the coupling of each car in its preselected classification track at a limited coupling speed, car speed regulating means disposed along the track rails and operable to different conditions to variously regulate the speed of each car rolling along said track rails, contactor means located along the trackway a limited distance in advance of said car speed regulating means and operated by the passage of each car moving over it, a speed detector of the radio-frequency type located adjacent said car speed regulating means and responsive to the speed of a car approaching and passing through said car speed regulating means, and circuit means governed by said speed detector only after a car has actuated said contactor for causing said speed regulating means to act on that car to correct its speed to be substantially a particular preselected value as that car leaves said car speed regulating means.

6. In an organization for the control of car retarders in a classification yard, a car retarder located along a track and operative between a released position and a wheel engaging position for effecting the deceleration of a car passing through it, contactor means located along the trackway a limited distance in advance of said retarder and operated upon the passage of a car over it, a speed detector of the radio frequency type located adjacent said retarder and responsive to the speed of a car approaching and passing through said retarder, said speed detector including speed registering means rendered effective to register the speed of a passing car only after said contactor has been operated by such passing, and circuit means controlled by said speed registering means for operating said retarder to said wheel engaging position when the registered speed of said car is above a preselected value and for operating said retarder to said released position when the registered speed of said car is below a preselected value.

7. In an organizataion for the control of the speed of cars passing through a classification yard to effect a coupling of each car in its classification track at a speed below a preselected maximum speed, car speed regulating means disposed along the track rails and operable to different conditions to variously change the speed of each car passing through it over the track rails, car presence detecting means located a short distance in advance of said car speed regulating means and rendered active by the passage of a car, a speed detector of the radio-frequency type located adjacent said car speed regulating means and responsive to the speed of a car approaching and passing through said car speed regulating means, and circuit means governed by said speed detector only after a car has actuated said car presence detecting means for causing said speed regulating means to act on that car to change its speed to be substantially a particular preselected value as that car leaves said car speed regulating means.

8. A car retarder control system comprising in combination, a stretch of railway track including a car retarder having respective entering and leaving ends for a given direction of traffic and having a multiple position operating mechanism for governing the degree of retardation applied to a car by said retarder, entering detector means disposed in said stretch of track in approach to the entering end of said car retarder and subject to actuation by cars approaching said car retarder, radar speed responsive means having a directional antenna with a radiation pattern governing the area of said car retarder and extending to said entering detector means, said speed responsive means having speed relays selectively operable in response to different travelling speeds of a car within the radiation pattern, and circuit means for governing the degree of operation of said multiple position operating mechanism in accordance with the speed of a car as indicated by the condition of said speed responsive relays, said circuit means being rendered effective only provided said entering detector means has been actuated by a car.

9. In combination with a stretch of railway track equipped with a car retarder operable to exert different braking forces according to the control terminal to which current is supplied, a car speed measuring means having connections with the retarder and operable to repeatedly measure the speed of a car cut passing through the retarder, a car rolling condition compensating switching means operable to a first, a second and a third position according as normal, high or low leaving speeds for car cuts to leave the retarder are desired, a braking force selective means including circuit networks which can be prearranged with different control circuits and having connections with the retarder terminals to selectively supply current thereto according to the control circuits made effective, and circuit means including contacts of said speed measuring means and contacts of said switching means with connections to said braking force speed selective means to automatically render effective control circuits of the braking force speed selective means according to the position of said switching means and the speed of a car cut passing through the retarder to obtain different speeds preselected for the cut to leave the retarder.

10. The invention according to claim 9 wherein the car speed measuring means comprises radar speed measuring means having an antenna with a radiation pattern including at least the area of the retarder for generating a speed signal.

11. The invention according to claim 9 wherein the rolling condition compensating means is governed by a manually operable switch for selectively designating the normal, high or low leaving speeds for car cuts to leave the retarder.

12. In combination with a stretch of railway track equipped with a car retarder and formed with a track section in the approach to the retarder, the retarder being operable to exert different braking forces according to the control terminal to which current is supplied to obtain a plurality of different speeds at which car cuts may leave the retarder, an occupancy relay means associated with the retarder and the approach track section and operable to a first or a second position as the track section and retarder are not or are occupied by a car cut, a car weight storage relay means energizable in a plurality of different arrangements, a car weighing means including an element mounted in the track section and circuits having connections with the storage relay means to initially energize the storage relay means in a different arrangement according to the measured weight of each car, a stick circuit means including a second position contact of said occupancy relay means with connections to the storage relay means to retain it energized at the arrangement initially energized, a car speed measuring means having connections with the retarder and operable to repeatedly measure the speed of a car cut passing through the retarder, a car rolling condition compensating switching means operable to a first, a second and a third position according as normal, high or low retarder leaving speeds are desired, a braking force speed selective means including circuit networks adaptable of being prearranged with different control circuits and having connections with the retarder control terminals to selectively supply current to the retarder; and circuit means including contacts of said weight storage relay means, contacts of said speed measuring means and contacts of said compensating switching means with connections to said braking force speed selective means to automatically select prepared control circuits thereof which obtain a retarder leaving speed desired according to the weight and rolling condition of the car cut passing through the retarder.

13. A car retarder control system comprising in combination, a stretch of railway track including a plurality of successive car retarders, each retarder being operable to a plurality of different braking conditions, retarder control means for each retarder operable to actuate that retarder selectively to different braking conditions in accordance with a plurality of different parameters indicative of the braking requirements for each car passing through the associated retarder, storage means for each retarder for storing a particular one of said parameters for each car until said parameter is no longer needed for initially retarding that car in that retarder, each storage means acting upon the associated retarder control means for the associated retarder, means for determining said particular parameter and for storing said parameter in said storage means associated with the first of said retarders in response to the presence of a car in approach of said first retarder, and transfer means for transferring the storage of said particular parameter from said storage means for said first retarder to said storage means for a successive retarder prior to the entry of said car into said successive retarder.

References Cited by the Examiner

UNITED STATES PATENTS

| | | |
|---|---|---|
| 1,766,539 | 6/1930 | Prescott. |
| 2,022,086 | 11/1935 | Livingston. |
| 2,331,125 | 10/1943 | Logan. |
| 2,361,466 | 10/1944 | Fitzsimmons _____ 246—182 |
| 2,629,865 | 2/1953 | Barker. |
| 3,054,893 | 9/1962 | Dasburg _____ 246—182 |
| 3,089,029 | 5/1963 | Brinker _____ 246—182 |
| 3,125,315 | 3/1964 | Kendall et al. _____ 246—182 |
| 3,169,736 | 2/1965 | Brown _____ 246—182 |

FOREIGN PATENTS 921,845  1/1947  France.

OTHER REFERENCES

A thesis prepared by Wilhelm Koth and titled "Die Laufzielsteuerung In Der Ablaufdynamik," Germany, 151 pages. This thesis was available for public inspection on October 29, 1953.

ARTHUR L. LA POINT, *Primary Examiner.*

EUGENE G. BOTZ, *Examiner.*

S. T. KRAWCZEWICZ, *Assistant Examiner.*